(12) United States Patent
Wu et al.

(10) Patent No.: US 11,385,062 B2
(45) Date of Patent: Jul. 12, 2022

(54) MAP CREATION METHOD FOR MOBILE ROBOT AND PATH PLANNING METHOD BASED ON THE MAP

(71) Applicant: GUANGZHOU COAYU ROBOT CO., LTD, Guangzhou (CN)

(72) Inventors: Liangru Wu, Shenzhen (CN); Kai Yang, Shenzhen (CN); Zhuobin Zheng, Shenzhen (CN); Huang Ding, Shenzhen (CN)

(73) Assignee: GUANGZHOU COAYU ROBOT CO., LTD., Guangzhou (CN)

( * ) Notice: Subject to any disclaimer, the term of this patent is extended or adjusted under 35 U.S.C. 154(b) by 181 days.

(21) Appl. No.: 16/712,977

(22) Filed: Dec. 12, 2019

(65) Prior Publication Data
US 2020/0116501 A1 Apr. 16, 2020

Related U.S. Application Data

(63) Continuation of application No. PCT/CN2018/073930, filed on Jan. 24, 2018.

(30) Foreign Application Priority Data

Aug. 18, 2017 (CN) .......................... 201710713711.7

(51) Int. Cl.
*G01C 21/32* (2006.01)
*G01C 21/16* (2006.01)
*G05D 1/02* (2020.01)

(52) U.S. Cl.
CPC ............. *G01C 21/32* (2013.01); *G01C 21/16* (2013.01); *G05D 1/027* (2013.01); *G05D 1/0212* (2013.01); *G05D 1/0219* (2013.01); *G05D 2201/0203* (2013.01)

(58) Field of Classification Search
CPC ...... G01C 21/32; G01C 21/16; G01C 21/206; G01C 21/20; G05D 1/0212; G05D 1/0219;
(Continued)

(56) References Cited

U.S. PATENT DOCUMENTS 9,126,338 B2 9/2015 Lee et al.
2005/0071047 A1* 3/2005 Okabayashi ......... G05D 1/0038
700/245
(Continued)

FOREIGN PATENT DOCUMENTS

CN 102138769 A 8/2011
CN 102866706 A 1/2013
(Continued)

OTHER PUBLICATIONS

International Search Report and Written Opinion in corresponding International Application No. PCT/CN2018/073930, dated May 18, 2018, 7 pages.
(Continued)

*Primary Examiner* — Paula L Schneider
(74) *Attorney, Agent, or Firm* — Bayes PLLC (57) ABSTRACT

The present disclosure discloses a map creation method of a mobile robot, including establishing a rectangular coordinate system in a working area of the mobile robot; causing the mobile robot moving in a 弓 character shape in the working area; obtaining a key frame picture of the mobile robot at a point Pi and saving the picture and coordinates of the point Pi; obtaining a picture of the mobile robot at a point P'i, wherein an abscissa or ordinate of the point P'i is the same as that of the point Pi; extracting and matching features of the pictures acquired at the point Pi and the point P'i; calibrating coordinates of the mobile robot at the point P'i and data of the odometer and/or the gyroscope according to the matching result and saving them; and repeating the obtaining to the calibrating until the map creation in the working area is complete.

9 Claims, 9 Drawing Sheets

(58) Field of Classification Search
CPC ........... G05D 1/027; G05D 2201/0203; G05D 1/0246; G05D 1/0274; G06K 9/6288; G06V 20/10
USPC .......................................................... 701/26
See application file for complete search history.

(56) References Cited

U.S. PATENT DOCUMENTS

| | | | |
|---|---|---|---|
| 2016/0068114 A1 | 3/2016 | Liao | |
| 2017/0083022 A1* | 3/2017 | Tang | G05D 1/0214 |
| 2017/0312916 A1* | 11/2017 | Williams | G05D 1/0251 |
| 2018/0348783 A1* | 12/2018 | Pitzer | G05D 1/024 |

FOREIGN PATENT DOCUMENTS

| | | |
|---|---|---|
| CN | 104390643 A | 3/2015 |
| CN | 105856230 A | 8/2016 |
| CN | 106020207 A | 10/2016 |
| CN | 106355197 A | 1/2017 |
| CN | 106708048 A | 5/2017 |
| CN | 106767833 A | 5/2017 |
| CN | 107314773 A | 11/2017 |
| WO | 2016095965 A2 | 6/2016 |

OTHER PUBLICATIONS

Extended European Search Report and Written Opinion in related European Application No. 18846071.1, dated Oct. 30, 2020, 9 pages.

* cited by examiner

MAP CREATION METHOD FOR MOBILE ROBOT AND PATH PLANNING METHOD BASED ON THE MAP

CROSS REFERENCE TO RELATED APPLICATION

This application is continuation of International Application No. PCT/CN2018/073930, filed on Jan. 24, 2018, entitled "MAP CREATION METHOD FOR MOBILE ROBOT AND PATH PLANNING METHOD BASED ON THE MAP," which claims priority to Chinese Patent Application No. 201710713711.7 filed on Aug. 18, 2017, both of which are hereby incorporated by reference in their entireties.

BACKGROUND

The present disclosure relates to the field of mobile robots, and particularly to map creation and path planning of a mobile robot based on an inertial navigation system.

At present, the service robots on the market can automatically complete specific work in specific areas under the condition of unattended, which brings convenience to people and has a promising market prospect.

As a representative of service robots, cleaning robots are developing rapidly with huge market demand. Most of the existing cleaning robots are based on the inertial navigation system for positioning, map creation and navigation. However, since the errors of the components (gyroscope and odometer) of the inertial navigation system will gradually accumulate with the increase of the working time, which results in large errors, it makes the cleaning robot have the defects of inaccurate positioning and the map information have a larger difference from the reality, as well as causes path planning not being able to be implemented, etc.

In addition, the complexity of the working environment of the cleaning robot, the fluctuation of the friction coefficient between the walking mechanism and the work, and the error caused by sliding (or being trapped) of the walking mechanism will also affect the accuracy of the inertial navigation system.

SUMMARY

One of the objects of the present disclosure is to overcome the defects in the background technology and provide a map creation method of a mobile robot, the specific solution being as follows:

a map creation method of a mobile robot, the mobile robot including an odometer, a gyroscope and a camera, comprises the following steps: S1: establishing a rectangular coordinate system in a working area of the mobile robot; S2: the mobile robot moving in a character shape in the working area; S3: obtaining a key frame picture of the mobile robot at a point Pi and saving the picture and coordinates of the point Pi; S4: obtaining a picture of the mobile robot at a point P'i, wherein an abscissa or ordinate of the point P'i is the same as that of the point Pi; S5: according to an Oriented FAST and Rotated BRIEF (ORB) algorithm, extracting and matching features of the pictures acquired at the point Pi and the point P'i; S6: calibrating coordinates of the mobile robot at the point P'i and data of the odometer and/or the gyroscope according to the matching result and saving them; S7: repeating steps S3 to S6 until the map creation in the working area is complete.

In a preferred embodiment of embodiments of the present disclosure, the step S2 includes the following sub-steps: S201: the mobile robot moving in a straight line in a positive direction of an X axis; S202: determining whether the mobile robot encounters an obstacle, if so, entering step 203, if not, entering step S206; S203: the mobile robot moving along the obstacle in a positive direction of a Y axis; S204: determining whether a coordinate change of the mobile robot on the Y axis is greater than a threshold value M, if so, entering step S208, if not, entering step S205; S205: determining whether a Y axis coordinate of the mobile robot is the same as that in step S201, if so, returning to step S201, if not, returning to step S203; S206: determining whether a straight-line travel distance of the mobile robot is greater than a threshold value N, if so, entering step S207, if not, returning to step S201; S207: the mobile robot, after shifting a distance M in a straight line in the positive direction of the Y axis, entering step S208; S208: the mobile robot moving in a straight line in a negative direction of the X axis; S209: determining whether the mobile robot encounters an obstacle, if so, entering step 210, if not, entering step S213; S210: the mobile robot moving along the obstacle in the positive direction of the Y axis; S211: determining whether a coordinate change of the mobile robot on the Y axis is greater than the threshold value M, if so, returning to step S201, if not, entering step S212; S212: determining whether the Y axis coordinate of the mobile robot is the same as that in step S208, if so, returning to step S208, if not, returning to step S210; S213: determining whether a straight-line travel distance of the mobile robot is greater than a threshold value N, if so, entering step S214, if not, returning to step S208;

S214: the mobile robot, after shifting a distance M in a straight line in the positive direction of the Y axis, returning to step S201.

Further, in one specific embodiment of the present disclosure, the mobile robot is a covered mobile robot, with a range of M as 0.2 m to 0.3 m and the range of N as 6 m to 8 m.

Further, in an optimized solution of the present disclosure, in the step S3, the mobile robot saves the key frame picture and coordinates of its corresponding point Pi at every predetermined distance interval.

Further, the minimum distance between adjacent key frame picture acquisition points Pi is 0.6 m.

Further, the distance between the point Pi and the point P'i having the same X coordinate or Y coordinate is 0.3 m to 0.6 m.

Further, the picture is preferably a ceiling picture or a ground picture of the working environment of the mobile robot.

The second object of the present disclosure is to overcome the defects in the background technology and provide a path planning method for a mobile robot. The specific solution is as follows:

A path planning method for a mobile robot, which is based on a map created by the above map creation method, comprises the following steps: S'1: the mobile robot moving from an initial position to a point Pi or point P'i; S'2: calibrating data of the odometer and/or the gyroscope at the point Pi or point P'i; S'3: repeating steps S'1 to step S'2 until arriving at a final target point.

Further, in a specific embodiment of the present disclosure, the step S1 includes the following sub-steps: S'11: obtaining coordinates of the initial position and coordinates of the final target point of the mobile robot; S'12: determining whether there is a point Pi or point P'i in a rectangular area composed of the coordinates of the initial position and the coordinates of the final target point, if yes, entering step S'13, if not, entering step S'14; S'13: the mobile robot moving to the point Pi or point P'i closest to the initial position in the rectangular area, and then entering step S'15; S'14: the mobile robot moving to the point Pi or point P'i closest to the initial position in the working area, and then entering step S'15; S'15: determining whether there is the point Pi or point P'i in the rectangular area composed of the coordinates of a current position and the final target point, if yes, returning to step S'13, if not moving to the final target point.

Further, in a specific embodiment of the present disclosure, the step S'2 includes the following sub-steps: S'21: acquiring a picture of the mobile robot at the point Pi or point P'i; S'22: extracting features of the picture according to an ORB algorithm and matching features with a picture saved at the point Pi or point P'i; S'23: calibrating the data of the odometer and/or the gyroscope of the mobile robot at the point Pi or P'i according to the matching result.

Further, the final target point includes an area the mobile robot does not pass through, a position of a charging base and a starting point of the mobile robot.

Compared with the prior art, the technical solution of the present disclosure has the following beneficial effects:

The present disclosure calibrates the coordinates and data of the odometer and/or the gyroscope of a mobile robot in the process of map creation through image matching technology (ORB algorithm), reduces the accumulated errors of coordinates and angles, and improves the accuracy of map.

BRIEF DESCRIPTION OF THE DRAWINGS

In order to more clearly explain the technical solution of the embodiment of the present disclosure, the following will be a brief introduction of the drawings to be used in the embodiment. It is obvious that the drawings in the following description are some embodiments of the present disclosure, and for a person having ordinary skill in the art, other drawings can also be obtained based on these drawings without involving inventive skills.

DETAILED DESCRIPTION

A clear and complete description of the technical solution of the present disclosure will be provided in conjunction with the drawings and a specific embodiment. It is clear that the embodiment described here is only a portion of the embodiments of the present disclosure, not all embodiments. Based on the specific embodiment described in the present disclosure, all other embodiments obtained by a person having ordinary skill in the art without inventive skills shall fall within the scope of protection of the present disclosure.

The mobile robot in the present disclosure is based on an inertial navigation system, including an odometer, a gyroscope, and a camera. Wherein the odometer is used to obtain the walking distance of the mobile robot, the gyroscope is used to obtain the walking angle of the mobile robot, and the camera is installed at the bottom or top of the mobile robot to obtain the picture information of the environment.

The mobile robot in the present disclosure is especially a covered robot working in a designated closed area, such as a security patrol robot or a cleaning robot working in an indoor environment, a mowing robot working in a specific lawn area and a cleaning robot cleaning the swimming pool, etc.

In addition, the mobile robot also includes a power module, a walking module, a sensor module, a control module, a storage module, and a function module. Wherein, the power module is a rechargeable battery, which is used to provide power for the mobile robot when it works; the walking module includes a driving motor and a walking wheel, which is used to make the mobile robot move in the working area; the sensor module is used to receive the environmental information of the working area and feed it back to the control module; the control module is used to control the movement of the mobile robot according to the information fed back by the sensor module; the function module refers to specific functions of the mobile robot, such as a cleaning module of a cleaning robot, a rotating knife seat of a mowing robot, etc.

Figure 1:
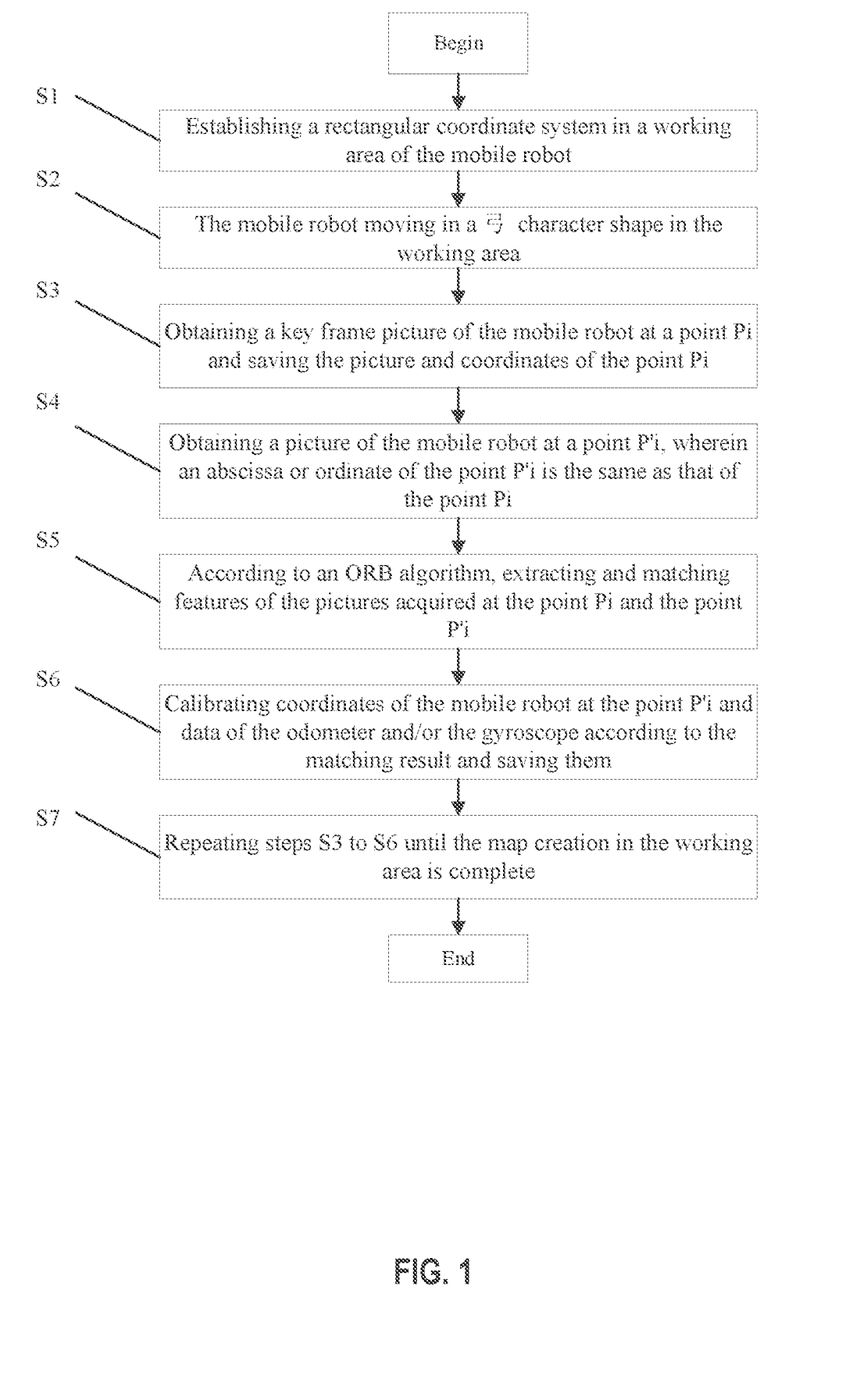
FIG. 1 is an overall flow chart of a map creation method of a mobile robot of the present disclosure.

FIG. 1 shows a flow chart of the map creation of the mobile robot of the present disclosure.

S1: establishing a rectangular coordinate system in a working area of the mobile robot.

Namely, a rectangular coordinate system composed of an abscissa (X) and an ordinate (Y) is established in the working area of the mobile robot, and the starting point of work, a corner of the working area and the charging base are preferred to be the origin.

S2: the mobile robot walking in a character shape in the working area.

Namely, the mobile robot starts to walk in a straight line in a certain direction until it meets an obstacle or the boundary of the working area or walks a predetermined distance, then walks in a straight line a certain distance in a direction perpendicular to the above direction, then walks in the reverse direction, and then repeats the above process until the coverage of the working area is completed.

Figure 2:
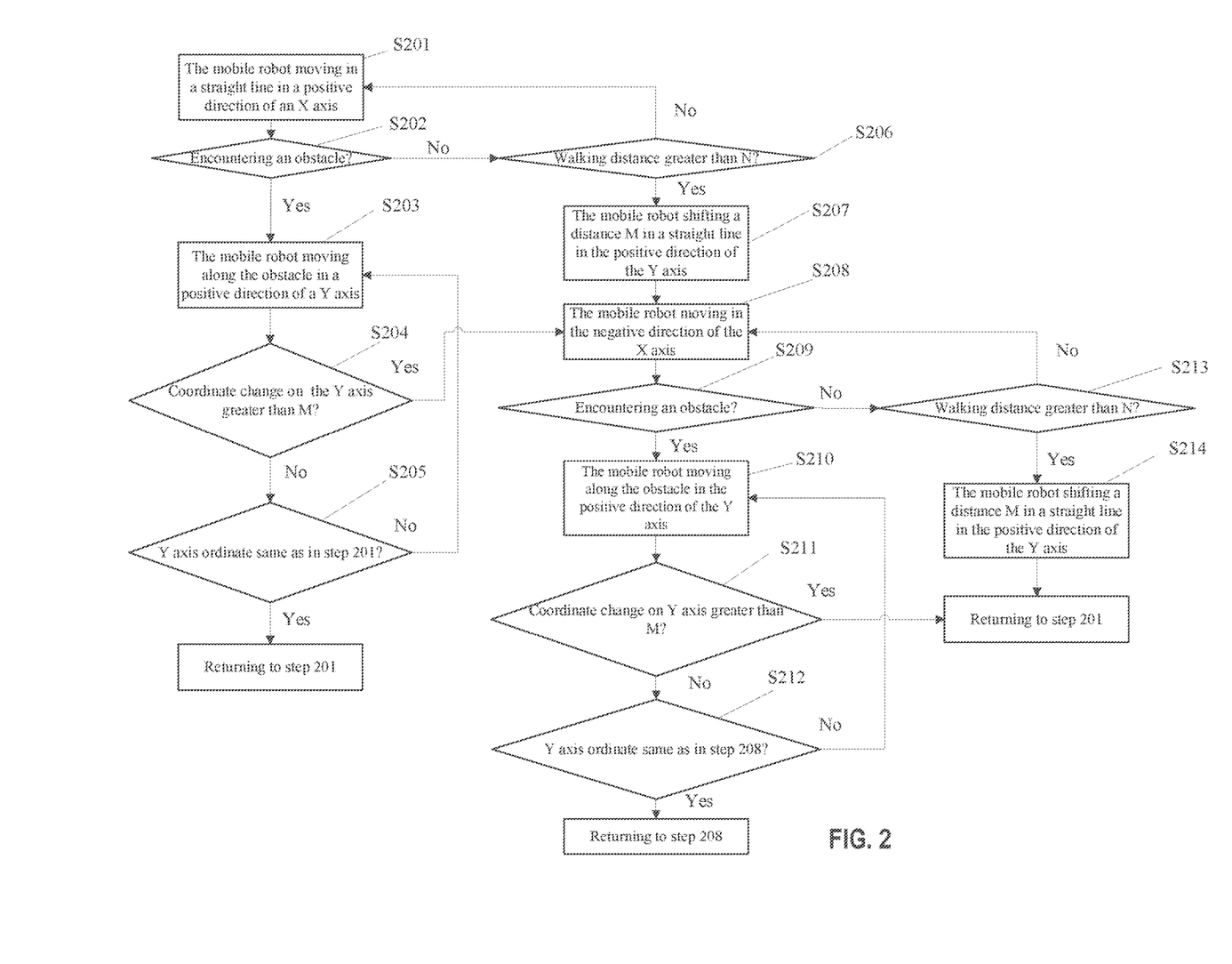
FIG. 2 is a flow chart of an optimized solution of step S2 in FIG. 1.

As shown in FIG. 2, in the optimized solution of this step, a rectangular coordinate system is established using the position when the mobile robot starts to work as the origin, the direction in which the mobile robot starts to walk as a positive direction of the X axis, and the direction perpendicular and to the left side of the moving direction of the mobile robot as a positive direction of the Y axis, and the 弓 character shaped walking in the working area is completed according to the following steps in turn: S201: the mobile robot moving in a straight line in the positive direction of the X axis; S202: determining whether the mobile robot encounters an obstacle, if so, entering step 203, if not, entering step S206; S203: the mobile robot moving along the obstacle in the positive direction of the Y axis, it should be noted that walking along the obstacle in the positive direction of the Y axis here means that the mobile robot will walk in the positive direction of the Y axis (i.e. the increasing direction of Y axis coordinate) when encountering the obstacle, if the obstacle is an arc or convex structure, the mobile robot may walk in the negative direction of the Y axis (i.e. the decreasing direction of Y axis coordinate) after walking along the obstacle for a period of time; S204: determining whether a coordinate change of the mobile robot on the Y axis is greater than a threshold value M, if so, entering step S208, if not, entering step S205; S205: determining whether the Y axis coordinate of the mobile robot is the same as that in step S201, if so, returning to step S201, if not, returning to step S203; S206: determining whether a straight-line travel distance of the mobile robot is greater than a threshold value N, if so, entering step S207, if not, returning to step S201; S207: the mobile robot, after shifting a distance M in a straight line in the positive direction of the Y axis, entering step S208; S208: the mobile robot moving in a straight line in the negative direction of the X axis; S209: determining whether the mobile robot encounters an obstacle, if so, entering step 210, if not, entering step S213; S210: the mobile robot moving along the obstacle in the positive direction of the Y axis; S211: determining whether a coordinate change of the mobile robot on the Y axis is greater than the threshold value M, if so, returning to step S201, if not, entering step S212; S212: determining whether the Y axis coordinate of the mobile robot is the same as that in step S208, if so, returning to step S208, if not, returning to step S210; S213: determining whether a straight-line travel distance of the mobile robot is greater than the threshold value N, if so, entering Step S214, if not, returning to step S208; S214: the mobile robot, after shifting a distance M in a straight line in the positive direction of the Y axis, returning to step S201.

S3: obtaining a key frame picture of the mobile robot at a point Pi and saving the picture and coordinates of the point Pi.

The mobile ground robot starts to move, and in the process of walking, it constantly takes pictures of the ceiling or the ground through the camera and carries out feature matching. For example, at the point Pi (i is a positive integer), it screens out the key frame pictures with obvious features, saves the key frame pictures and stores the coordinates of the point Pi in the rectangular coordinate system. At this time, as the mobile robot just starts to move and the data of its odometer and gyroscope are accurate, the coordinates of the Pi point read from the odometer and the gyroscope can be saved directly. Then the mobile robot continues to walk and continuously takes pictures of the ceiling or the ground through the camera and carries out feature matching. If the key frame with obvious features is screened again, it is to be determined whether the distance between the coordinates of the key frame and the coordinates of the Pi of the stored key frame picture (including the X axis or Y axis direction) is greater than a predetermined value (such as 0.6 m). If so, the key frame picture and corresponding coordinates of this point are saved. Otherwise, the saving of this point is abandoned (because saving too many key frames and the frequent calibration affects the efficiency of the mobile robot). Accordingly, the key frame picture and the coordinates of the picture acquisition point Pi in the working area are saved.

S4: obtaining a picture of the mobile robot at a point P'i, wherein an abscissa or ordinate of the point P'i is the same as that of the point Pi.

Since the mobile robot moves in a character shape, the mobile robot will move in a reverse direction after shifting a certain distance when encountering an obstacle, a working area boundary or walking a predetermined distance, and will pass through the point P'i having the same abscissa or ordinate as the point Pi and obtain a picture of the mobile robot at the point P'i. Preferably, the distance between the point P'i and the point Pi is within a certain range, such as 0.3 m to 0.6 m, so as to take into account the working efficiency and matching accuracy of the mobile robot. Wherein, the abscissa or ordinate of the point P'i and the point Pi being the same makes the two pictures match well at a certain angle, which can improve the matching efficiency and reduce mismatching.

S5: according to an ORB algorithm, extracting and matching features of the pictures acquired at the point Pi and the point P'i.

Feature extraction is performed to the pictures obtained at the point Pi and point P'i through the ORB algorithm and then feature matching is performed to the features extracted from the two pictures.

S6: calibrating the coordinates of the mobile robot at the point P'i and the data of the odometer and/or the gyroscope according to the matching result and saving them.

The actual physical offset and angle offset are calculated according to the image pixel offset obtained from the point Pi and the point P'i, and the result is fed back to the mobile robot. Then the mobile robot calibrates the coordinates of the point P'i and the measurement data of the odometer and the gyroscope according to the result.

S7: repeating steps S3 to S6 until the map creation in the working area is complete.

Figure 3:
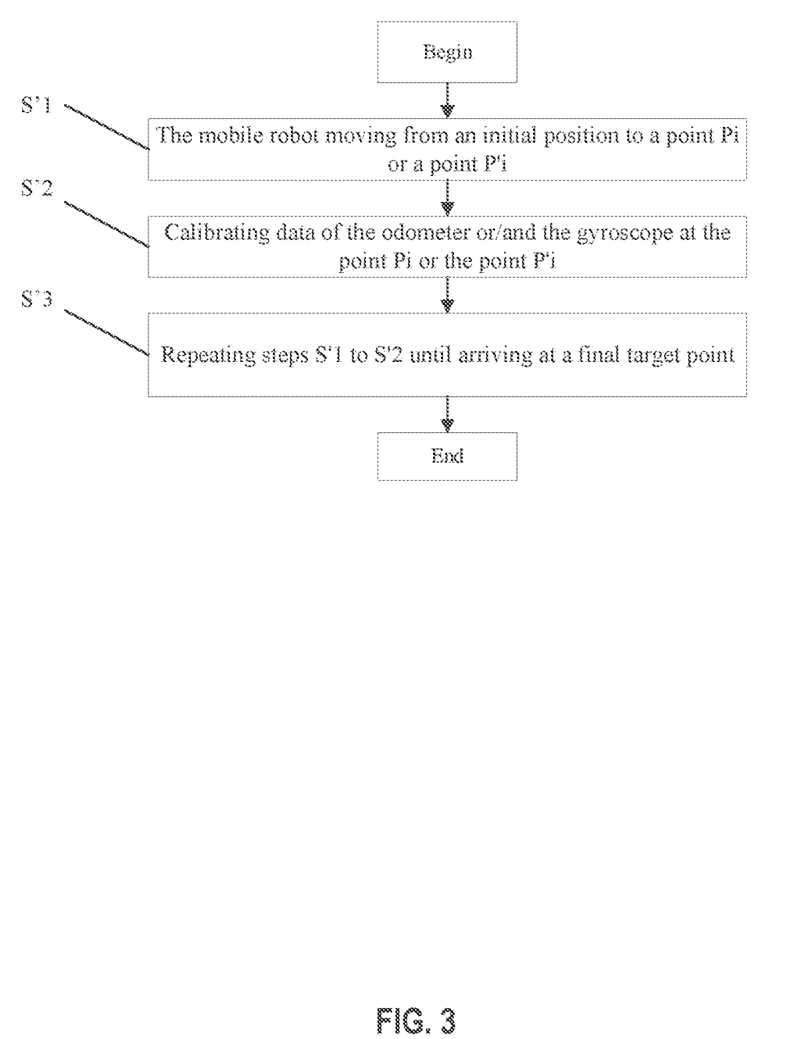
FIG. 3 is a flow chart of a path planning method of a mobile robot of the present disclosure.

FIG. 3 shows a path planning flow chart of the mobile robot of the method of the present disclosure, and the path planning method of the mobile robot is based on the map created by the above map creation method.

S'1: the mobile robot moving from an initial position to the point Pi or the point P'i.

Figure 4:
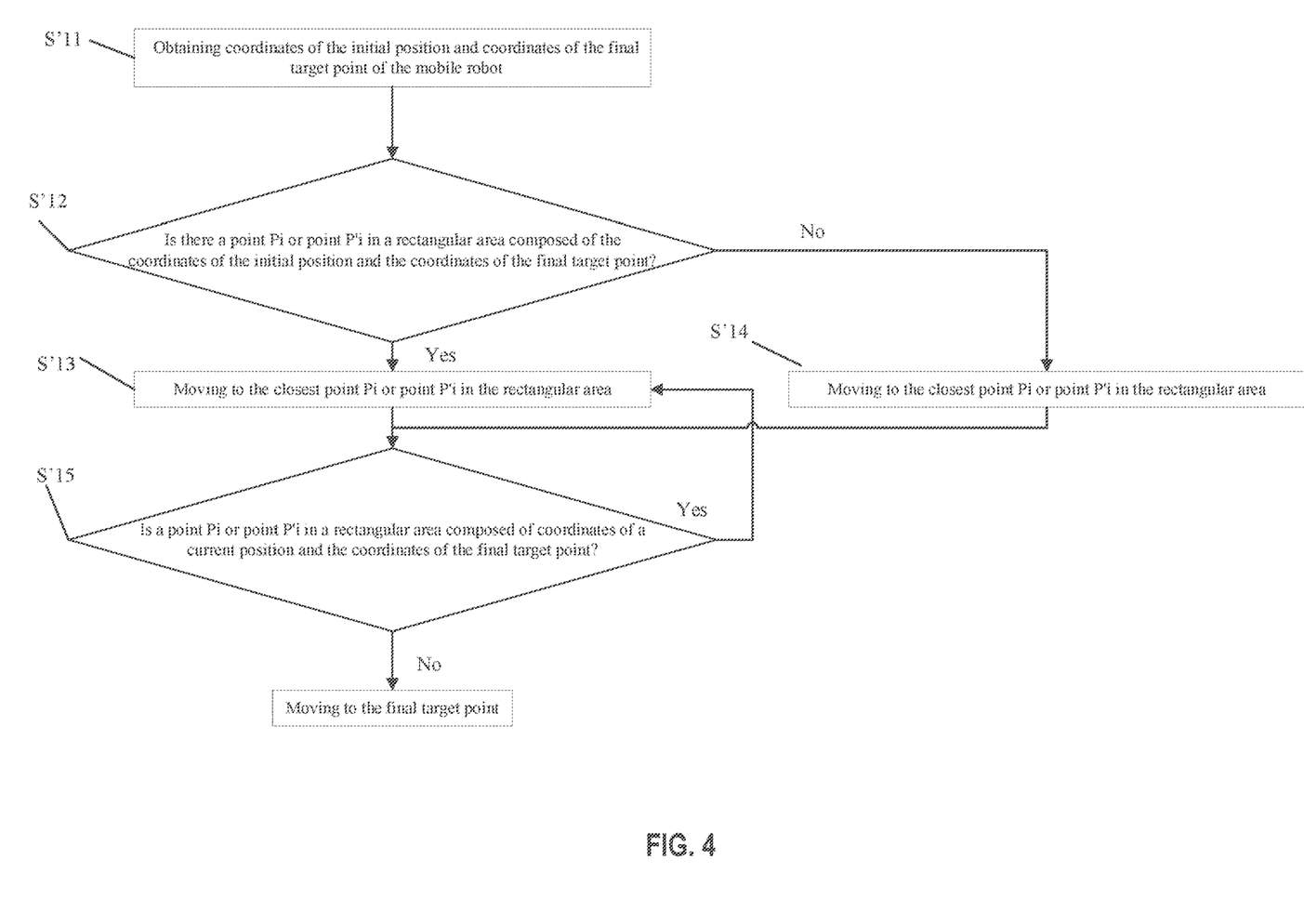
FIG. 4 is a flow chart of an optimized solution of step S'1 in FIG. 3.

As shown in FIG. 4, in a specific embodiment of the method of the present disclosure, the step S'1 includes the following sub-steps: S'11: obtaining the coordinates of the initial position and the coordinates of the final target point of the mobile robot; S'12: determining whether there is a point Pi or point P'i in the rectangular area composed of the coordinates of the initial position and the final target point, if yes, entering step S'13, if not, entering step S'14; S'13: the mobile robot moving to the point Pi or point P'i closest to the initial position in the rectangular area, and then entering step S'15; S'14: the mobile robot moving to the point Pi or point P'i closest to the initial position in the working area, and then entering step S'15; S'15: determining whether there is the point Pi or point P'i in the rectangular area composed of coordinates of a current position and the coordinates of the final target point, if yes, returning to step S'13, if not moving to the final target point.

S'2: calibrating data of the odometer and/or the gyroscope at the point Pi or point P'i.

Figure 5:
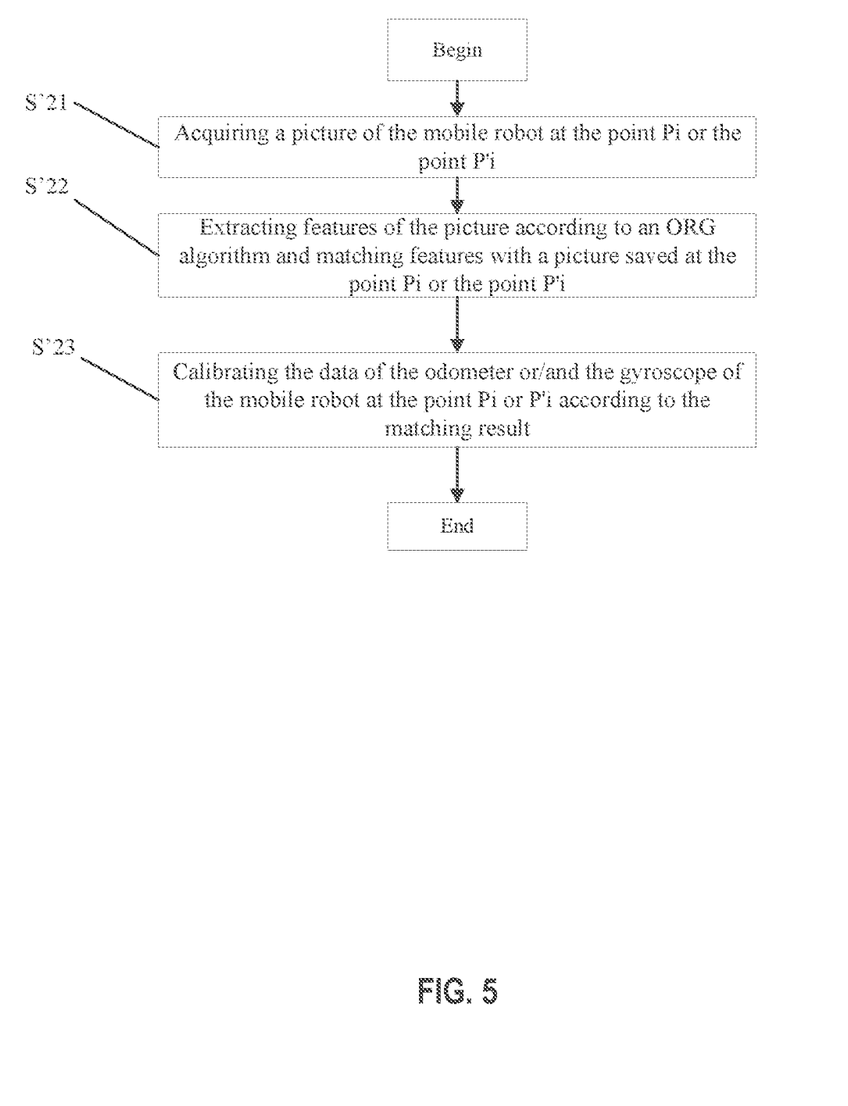
FIG. 5 is a flow chart of an optimized solution of step S'2 in FIG. 3.

As shown in FIG. 5, in a specific embodiment of the present disclosure, the step S'2 includes the following sub-steps: S'21: acquiring a picture of the mobile robot at the point Pi or point P'i; S'22: extracting features of the picture according to the ORB algorithm and matching features with a picture saved at the point Pi or point P'i; S'23: calibrating the data of the odometer and/or the gyroscope of the mobile robot at the point Pi or P'i according to the matching result.

S'3: repeating steps S'1 to step S'2 until arriving at a final target point.

Through the above method, before the mobile robot moves to the final target point, the odometer and gyroscope are calibrated at least once at the point Pi or point P'i, the accumulated error of the odometer and gyroscope is eliminated to a certain extent, and the success rate of the mobile robot arriving at the final target point is improved. The final target point of this method includes an area that the mobile robot does not pass through, a position of a charging base and a starting point of the mobile robot.

The following is described in combination with specific embodiments.

Embodiment 1

Figure 6:
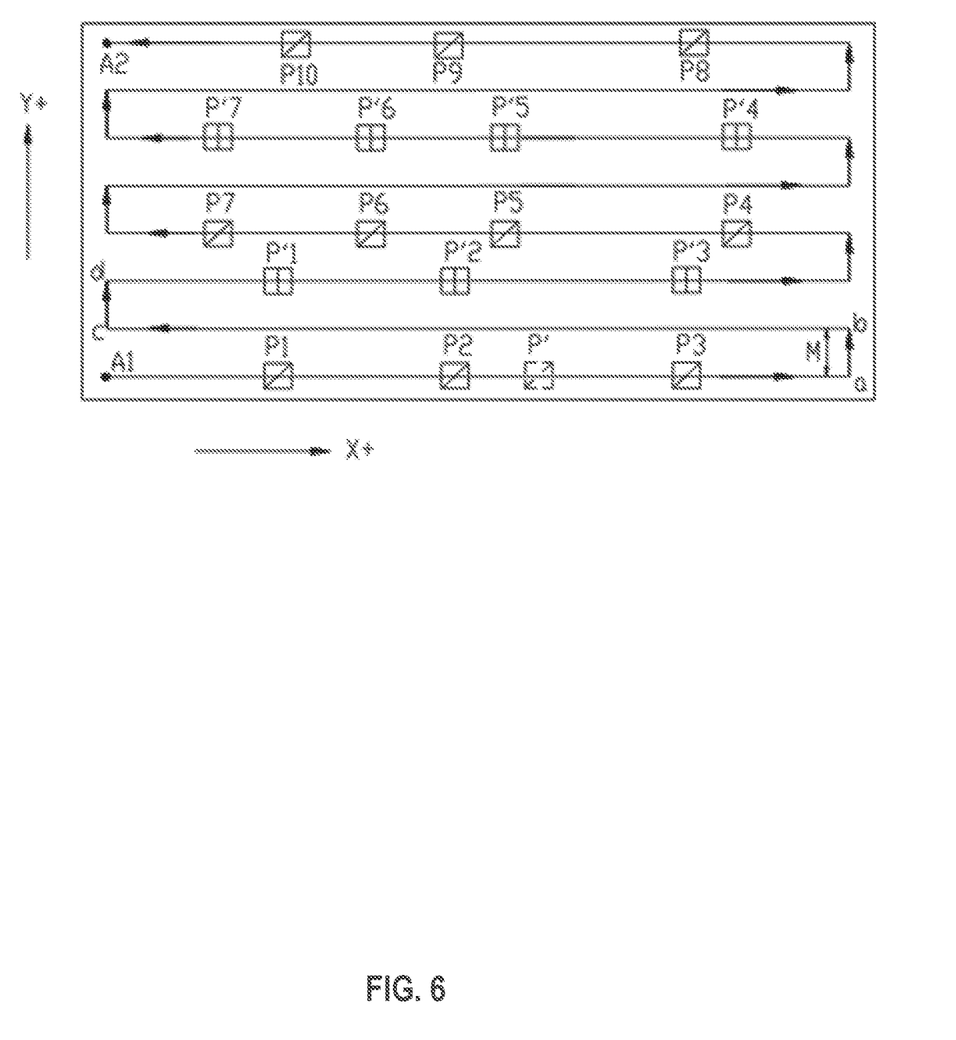
FIG. 6 is a map creation diagram of embodiment 1 of the present disclosure.
Figure 7:
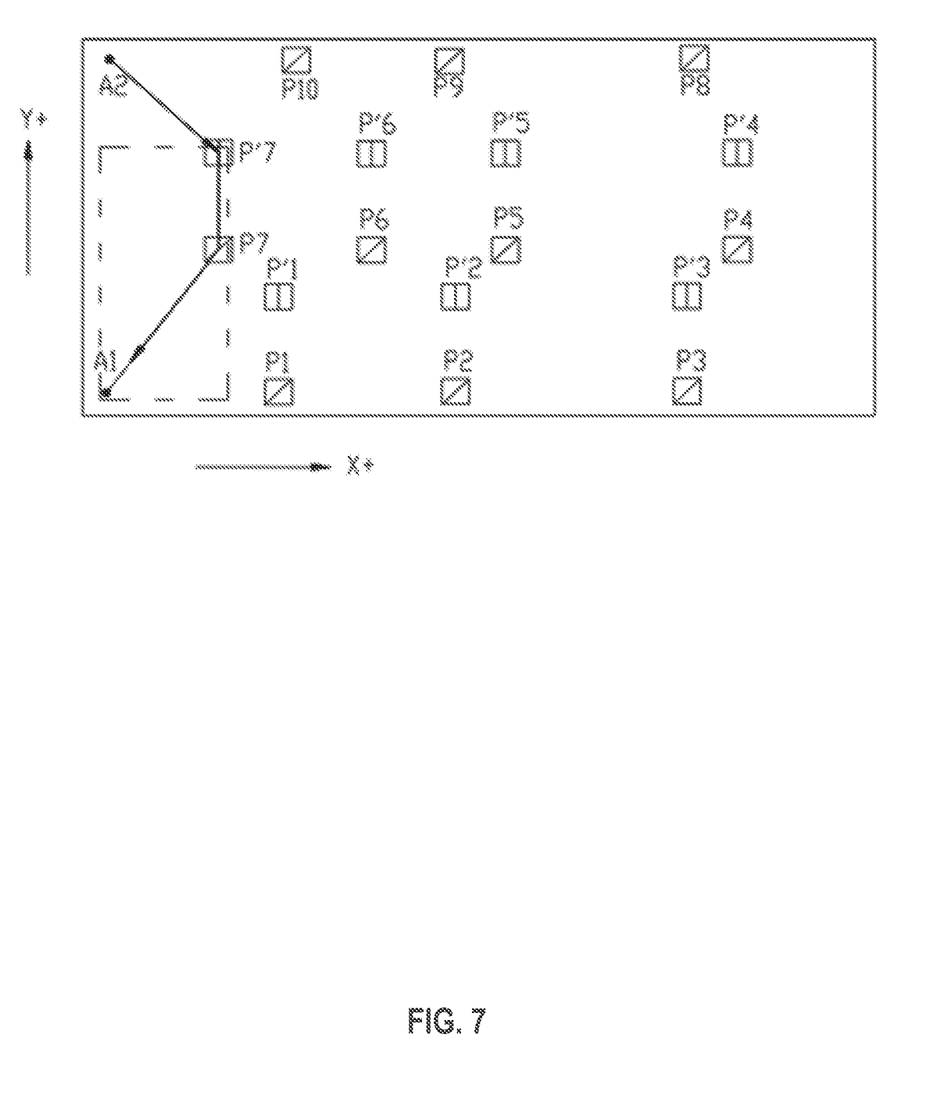
FIG. 7 is a path planning graph of the mobile robot based on the map in FIG. 6.

The mobile robot in this embodiment is illustrated by taking a cleaning robot as an example. FIG. 6 and FIG. 7 respectively show the map creation diagram and path planning diagram of the cleaning robot in a rectangular barrier-free space.

As shown in FIG. 6, a rectangular coordinate system is established using the starting point A1 of the cleaning robot as the origin, the forward direction of the cleaning robot as the positive direction of the X axis, and the direction perpendicular to the left side of the cleaning robot as the positive direction of the Y axis. The cleaning robot moves forward to the point P1 and the point P2 successively, selects key frame pictures with obvious features, saves the pictures and coordinates of the point P1 and the point P2 (the coordinates of the point P1 and the point P2 are directly obtained by the odometer and the gyroscope, and because the cleaning robot just starts to walk, the data of the odometer and the gyroscope are accurate), with the distance between the abscissas of the point P1 and the point P2 being greater than that of a predetermined value (e.g. 0.6 m).

When the cleaning robot moves to the point P', the key frame picture with obvious features is also screened out. At this time, since the distance between the point P' and the saved point P2 is less than 0.6 m, saving the key frame picture at the point P' and the coordinates of the point P' is abandoned.

The cleaning robot continues to move, and at the point P3 saves the key frame picture and the coordinates of the point P3, then moves to the point a to meet the boundary of the working area, and then moves a predetermined distance M in the positive direction of the Y axis to the point b, where M is the body width of the cleaning robot (0.25 m in this embodiment), and then walks in the negative direction of the X axis, passing through points having the same abscissa X as that of the point P3, point P2, and point P1 successively. Since the distance between these points (on the b-c line) and the corresponding points (on the A1-a line) is less than a preset value (0.4 m in this embodiment), it is not necessary to save and calibrate the coordinates or pictures of the relevant points (too dense picture saving and calibration will affect the working efficiency of the cleaning robot).

The cleaning robot continues to move to the point c to meet the boundary of the working area, then moves a predetermined distance M in the positive direction of the Y axis to the point d, then moves in the positive direction of the X axis, and then passes through points having the same abscissa X as the point P1, the point P2, and the point P3 in turn. At this time, the cleaning robot has shifted two Ms, i.e., 0.5 m, which is greater than the preset value (0.4 m), so the cleaning robot obtains pictures of the corresponding points (point P'1, point P'2, point P'3) and performs feature extraction and matching through the ORB algorithm on the key frame pictures saved at the points (point P1, point P2, point P3) having the same abscissa X, and then calibrates the coordinates of the point P'1, the point P'2, the point P'3 and the data of the odometer and/or the gyroscope at the point P'1, the point P'2, the point P'3 according to the matching result. It should be noted that in order to improve efficiency, when the cleaning robot moves along the same straight line, as long as the coordinates of a certain point and the data of the odometer and/or the gyroscope are calibrated successfully, it is not necessary to calibrate other points on the straight line. Namely, when calibration is successful at the point P'1, it is not necessary to calibrate at the point P'2 and the point P'3. When calibration is successful at the point P'2, it is not necessary to calibrate at the point P'3.

Then, the cleaning robot continues to move in the positive direction of the X axis to the boundary of the working area, Then the key frame pictures with obvious features and their corresponding points (P4, P5, P6, P7) are screened out and saved. Then calibrate the data of the odometer and the gyroscope and the coordinates at the corresponding points (P'4, P'5, P'6, P'7).

Repeat the above steps until the map creation within the rectangular area is completed.

As shown in FIG. 7, when the cleaning robot moves to the point A2, the map creation of the rectangular area is completed. At this time, the cleaning robot starts to look for the final target point to return. In this embodiment, it is the starting point A1 of the cleaning robot. Since there is no point Pi or point P'i in the rectangular area composed of the coordinates of the point A1 and the point A2, the cleaning robot will move to the point P'7, and then at the point P'7 calibrate the data of the odometer and/or the gyroscope; then the cleaning robot will move from the point P'7 to the final target point A1. Since the point P7 is in the rectangular area (rectangular box made of dotted lines) composed of coordinates of the point P'7 and the point A1, the cleaning robot will move to the point P7, and then at the point P7 calibrates the data of the odometer and/or the gyroscope; then the cleaning robot will move from the point P7 to the final target point A1. Since there is no point Pi or point P'i in the rectangular area composed of the coordinates of the point P7 and the point A1, the cleaning robot will move directly from the point P7 to the final target point A1, and its walking path is shown by the arrow in the figure.

Embodiment 2

Figure 8:
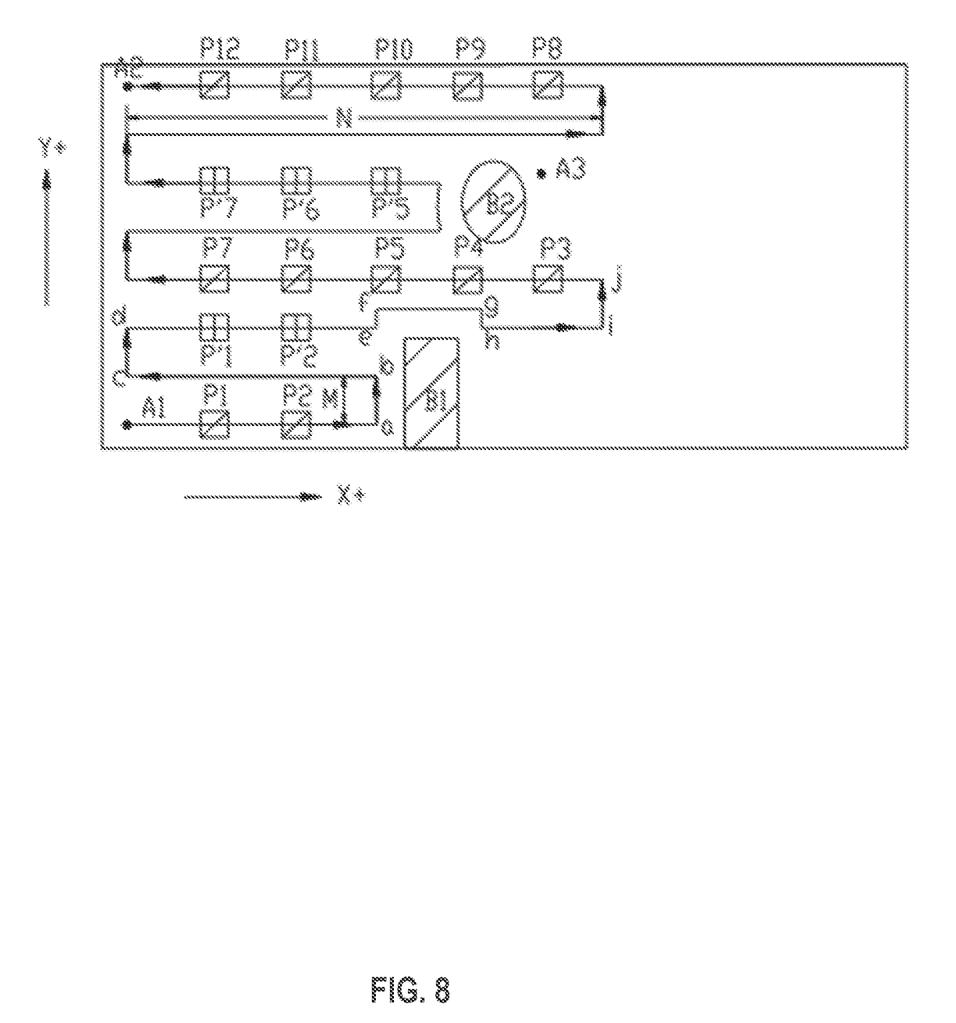
FIG. 8 is a map creation diagram of embodiment 2 of the present disclosure.
Figure 9:
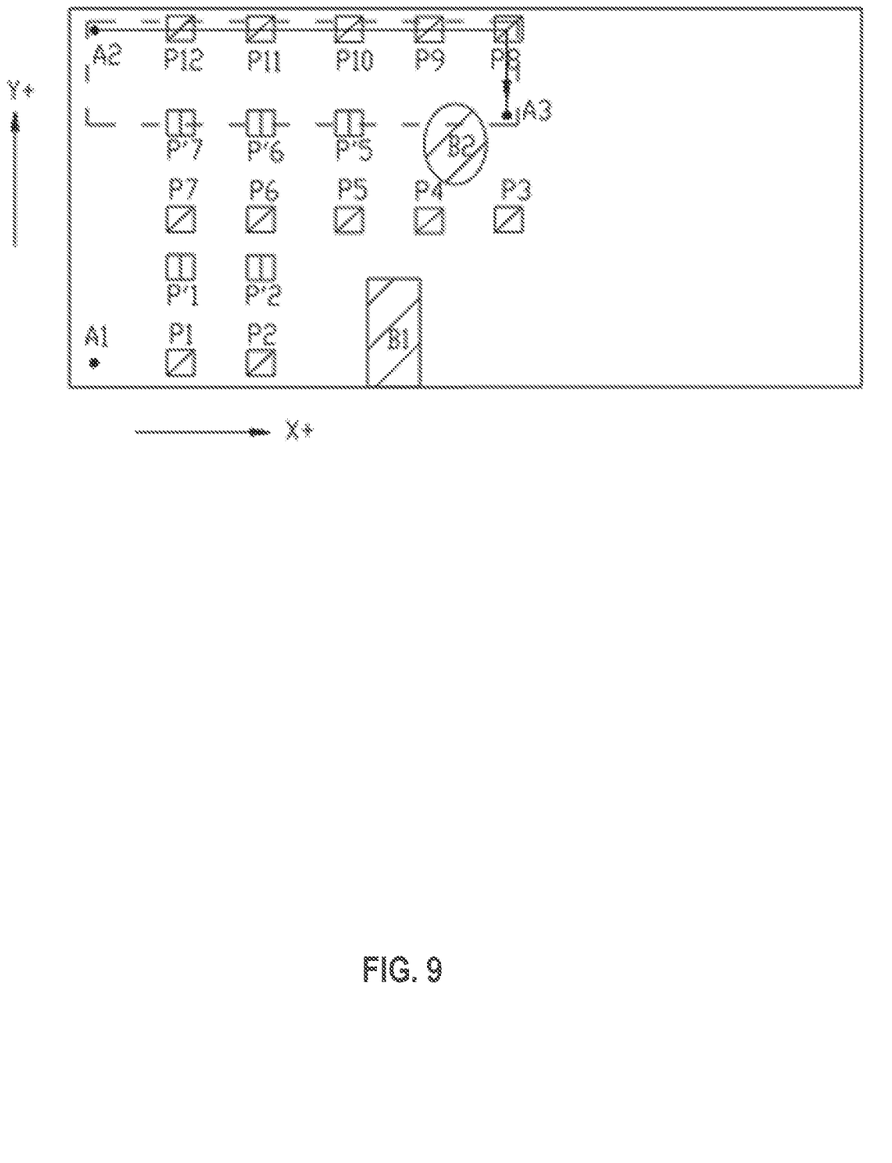
FIG. 9 is a path planning graph of the mobile robot based on the map in FIG. 8.

The mobile robot in this embodiment is also illustrated by taking a cleaning robot as an example. FIG. 8 and FIG. 9 respectively show the map creation diagram and path planning diagram of the cleaning robot in a rectangular working area including a rectangular obstacle B1 and an elliptical obstacle B2.

As shown in FIG. 8, a rectangular coordinate system is established using the starting point A1 of the cleaning robot as the origin, the forward direction of the cleaning robot as the positive direction of the X axis, and the direction perpendicular to the left side of the cleaning robot as the positive direction of the Y axis. The cleaning robot moves forward to the point P1 and the point P2 successively, selects key frame pictures with obvious features and saves the pictures and coordinates of the point P1 and the point P2 (the coordinates of the point P1 and the point P2 are directly obtained by the odometer and the gyroscope, and because the cleaning robot just starts to walk, the data of the odometer and the gyroscope are accurate), in which the distance between the abscissas of the point P1 and the point P2 is greater than that of a predetermined value (e.g. 0.6 m).

When the cleaning robot moves to point a, it encounters the obstacle B1, and then walks a distance M (0.25 m in this embodiment) in the positive direction of the Y axis to reach the point b, and then walks in the reverse direction of the X axis, passing through points having the same abscissa X as the point P2 and the point P1 successively. Since the distance between these points (on the b-c line) and the corresponding points (on the A1-a line) is less than a preset value (0.4 m in this embodiment), it is not necessary to save and calibrate the coordinates or pictures of the relevant points (too dense picture saving and calibration will affect the efficiency of the cleaning robot).

The cleaning robot continues to move to the point c to meet the boundary of the working area, then moves in the positive direction of the Y axis a predetermined distance M to the point d, then moves in the positive direction of the X axis, and then passes through points having the same abscissa X as the point P1 and the point P2 in turn. At this time, since the cleaning robot has shifted two Ms, i.e. 0.5 m, which is greater than the preset value (0.4 m), the cleaning robot obtains pictures of the corresponding points (point P'1 and point P'2) and performs feature extraction and matching through the ORB algorithm on the key frame pictures saved at the points (point P1 and point P2) having the same abscissa X, and then calibrates the coordinates of the point P'1 and the point P'2 and the data of the odometer and/or the gyroscope at the point P'1 and the point P'2 according to the matching result. When the cleaning robot moves to the point e, it encounters the obstacle B1 again, and then moves around the obstacle B1 to the point f Since the distance in the Y axis direction between the point e and the point f is less than M (0.25 m), the cleaning robot will not turn to walk in the negative direction of the X-axis, and continues to move along the obstacle B1 until it reaches the point h. At this time, since the ordinate of the point h is the same as that of the point d, the cleaning robot stops moving along the obstacle B1 and moves in the positive direction of the X axis; when the cleaning robot moves to the point i, because the distance between the point d and the point i reaches 6 m (N in this embodiment is 6 m), the cleaning robot will move in the negative direction of the Y axis a distance M to reach the point j and then move in the negative direction of the X axis.

Accordingly, until arriving at the point A2, create a map of an area that the cleaning robot passes through according to the method in embodiment 1. Then the cleaning robot will move to an area that it has not passed through and create a map as described above until the map creation of the whole working area is completed.

The differences between the present embodiment and embodiment 1 are as follows:

1. The cleaning robot will automatically shift a distance M in the positive direction of the Y axis after moving a predetermined distance along the X axis, and then walk in the reverse direction along the X axis;

2. After the cleaning robot moves for a predetermined distance, the pictures of key frame picture points Pi and corresponding coordinates will be saved, that is, the distance between adjacent points Pi along the abscissa axis is the same.

As shown in FIG. 9, when the cleaning robot moves to the point A2, part of the map creation of the rectangular area is complete. At this time, the cleaning robot starts to look for the final target point to return. In this embodiment, it is the point A3 of the area that the cleaning robot has not passed through. Since the rectangular area (dotted box in the figure) composed of the coordinates of the point A1 and the point A3 contains points P8, P9, P10, P11, and P12, the cleaning robot will move to the point P12 closest to the point A2 and then calibrate the data of the odometer and/or the gyroscope at the point P12.

Accordingly, the cleaning robot passes through the points P11, P10, P9, and P8 successively, and then calibrates the data of the odometer and/or the gyroscope. When the cleaning robot reaches the point P8, since there is no point Pi or point P'i in the rectangular area composed of the point P8 and the final target point A3, the cleaning robot will move directly from the point P8 to the final target point A3, and its walking path is shown by the arrow in the figure.

What has been disclosed above are only embodiments of the technical solution of the present disclosure, and the scope of the present disclosure is not limited thereto. Therefore, equivalent variations according to the claims of the present disclosure are still within the scope of the present disclosure.

What is claimed is:

1. A method for creating a map for a mobile robot comprising an odometer and a gyroscope, the method comprising:
   S1: establishing a rectangular coordinate system in a working area of the mobile robot;
   S2: causing the mobile robot to move in an S-shaped pattern in the working area;
   S3: obtaining a key frame picture of the mobile robot at a point Pi and saving the picture and coordinates of the point Pi;
   S4: obtaining a picture of the mobile robot at a point P'i, wherein an abscissa or ordinate of the point P'i is the same as that of the point Pi;
   S5: extracting and matching features of the pictures acquired at the point Pi and the point P'i;
   S6: calibrating coordinates of the mobile robot at the point P'i and the data of the odometer and/or the gyroscope according to the matching result and saving them; and
   S7: repeating S3 to S6 until the map creation in the working area is complete.

2. The method of claim 1, wherein S2 further comprises:
   S201: causing the mobile robot to move in a straight line in a positive direction of an X axis;
   S202: determining whether the mobile robot encounters an obstacle, if so, entering step 203, if not, entering step S206;
   S203: causing the mobile robot to move along the obstacle in a positive direction of a Y axis;
   S204: determining whether a coordinate change of the mobile robot on the Y axis is greater than a threshold value M, if so, entering step S208, if not, entering step S205;
   S205: determining whether the Y axis coordinate of the mobile robot is the same as that in step S201, if so, returning to step S201, if not, returning to step S203;
   S206: determining whether a straight-line travel distance of the mobile robot is greater than a threshold value N, if so, entering Step S207, if not, returning to step S201;
   S207: the mobile robot, after shifting a distance M in a straight line in the positive direction of the Y axis, entering step S208;
   S208: causing the mobile robot to move in a straight line in a negative direction of the X axis;
   S209: determining whether the mobile robot encounters an obstacle, if so, going to step 210, if not, going to step S213;
   S210: causing the mobile robot to move along the obstacle in the positive direction of the Y axis;
   S211: determining whether a coordinate change of the mobile robot on the Y axis is greater than the threshold value M, if so, returning to step S201, if not, entering step S212;

S212: determining whether the Y axis coordinate of the mobile robot is the same as that in step S208, if so, returning to step S208, if not, returning to step S210;

S213: determining whether a straight-line walking distance of the mobile robot is greater than the threshold value N, if so, entering step S214, if not, returning to step S208; and S214: the mobile robot, after shifting a distance M in a straight line in the positive direction of the Y axis, returning to step S201.

3. The method of claim 2, wherein the mobile robot is a covered mobile robot, with a range of M as 0.2 m to 0.3 m and a range of N as 6 m to 8 m.

4. The method of claim 1, wherein at S3, the mobile robot saves the key frame picture and its corresponding point Pi coordinates at every predetermined distance interval.

5. The method of claim 1, wherein a minimum distance between adjacent key frame picture acquisition points Pi is 0.6 m.

6. The method of claim 1, wherein a distance between the point Pi and the point P'i having the same X coordinate or Y coordinate is 0.3 m to 0.6 m.

7. The method of claim 1, wherein the picture is a ceiling picture or a ground picture of a working environment of the mobile robot.

8. The method of claim 1, wherein at S4, the features of the pictures acquired at the point Pi and the point P'i are extracted and matched according to an Oriented FAST and Rotated BRIEF (ORB) algorithm.

9. The method of claim 1, wherein S6 further comprises:
calculating an actual physical offset and angle offset according to an image pixel offset obtained from the point Pi and the point P'i; and
feeding back a result to the mobile robot such that the mobile robot calibrates coordinates of the point P'i and measurement data of the odometer and the gyroscope according to the result.

* * * * *